310-10 SR

FIP8502 OR 3,564,307

[11] 3,564,307

[72] Inventors Ushio Kawabe;
Toshio Doi; Metsuhiro Kudo; Hiroshi Kimura; Nobuhiro Hara, Tokyo, Japan
[21] Appl. No. 843,555
[22] Filed July 22, 1969
[45] Patented Feb. 16, 1971
[73] Assignee Hitachi, Ltd.
Tokyo, Japan
[32] Priority July 24, 1968, Nov. 4, 1968, June 18, 1969
[33] Japan
[31] 42/5185, 42/79967 and 43/47595

[54] ROTARY ELECTRIC AC GENERATOR UTILIZING THE MAGNETIC SHIELDING AND TRAPPING BY SUPERCONDUCTING PLATES
7 Claims, 17 Drawing Figs.

[52] U.S. Cl. 310/10, 310/165
[51] Int. Cl. H02k, H01v 11/00
[50] Field of Search 310/10, 65, 67, 177, 178; 323/44FSC

[56] References Cited
UNITED STATES PATENTS
3,427,482 2/1969 Massar 310/10

*Primary Examiner*—D. X. Sliney
*Attorney*—Craig, Antonelli, Stewart & Hill

ABSTRACT: An AC generator having a plurality of parallelly spaced discs of inhomogeneous hard superconducting material rotatable about a common axis. The rotating discs are provided with a suitable number of registered slots, and armature coils are disposed between the discs so that the magnetic shielding and trapping property of the superconducting material is utilized for generating an alternating voltage.

INVENTORS
USHIO KAWABE, TOSHIO DOI, HIROSHI KIMURA
MITSUHIRO KUDO and NOBUHIRO HARA
BY Craig, Antonelli, Stewart & Hill
ATTORNEYS

INVENTORS

USHIO KAWABE, TOSHIO DOI, HIROSHI KIMURA, MITSUHIRO KUDO and NOBUHIRO HARA

BY Craig, Antonelli, Stewart & Hill

ATTORNEYS

INVENTORS
USHIO KAWABE, TOSHIO DOI, HIROSHI KIMURA,
MITSUHIRO KUDO and NOBUHIRO HARA
BY Craig, Antonelli, Stewart & Hill
ATTORNEYS

INVENTORS

USHIO KAWABE, TOSHIO DOI, HIROSHI KIMURA,

MITSUHIRO KUDO and NOBUHIRO HARA

BY Craig, Antonelli, Stewart & Hill

ATTORNEYS

ROTARY ELECTRIC AC GENERATOR UTILIZING THE MAGNETIC SHIELDING AND TRAPPING BY SUPERCONDUCTING PLATES

This invention relates to rotary AC generators and more particularly to an AC generator which includes a plurality of parallelly spaced plates of inhomogeneous hard superconducting material for utilizing the magnetic shielding and trapping property thereof for generating an alternating voltage.

Commonly, AC generators comprise a stator having a field winding and a rotor having an armature winding wound to generate an alternating voltage which is taken out from the armature winding through slip rings or a commutator. However, conventional generators have certain problems in that they are liable to develop noises and have a limited lifetime because they have mechanically contacting parts such as slip rings or commutator as described above. Further, such a generator is defective in that the weight of its rotor is quite heavy and thus it is difficult to obtain a high efficiency. Moreover, although the conventional generator can easily generate a sine wave voltage, it is extremely difficult for the generator to generate a voltage of other waveform such as, for example, a triangular waveform or rectangular waveform.

AC generators employing a superconducting material have been proposed which include those based on the same principle as that of the AC generators described above and those which utilize the Meissner effect of a soft superconducting material. However, the former is defective in that the armature coil is difficult to make, the field coil produces a weak magnetic field and the superconducting material has a large AC loss. While the latter overcomes these defects, its magnetic shielding effect is quite poor due to the fact that it utilizes the Meissner effect and thus it is not yet usable for practical applications.

It is therefore an object of the present invention to provide a novel AC generator which overcomes all of the defects of the prior art generators described above.

Another object of the present invention is to provide an AC generator of large capacity which exhibits a high electrical efficiency and is simple in construction.

A further object of the present invention is to provide an AC generator which is so constructed as to generate a voltage of waveform other than a sine wave, such as, for example, a triangular wave or rectangular wave.

The above and other objects, advantages and features of the present invention will be apparent from the following detailed description when read in conjunction with the accompanying drawings, in which.

Figure 1:
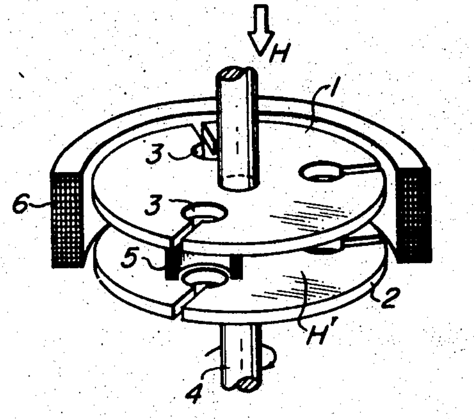
FIG. 1 is a schematic view for illustrating the basic principle of the present invention.
Figure 3A:
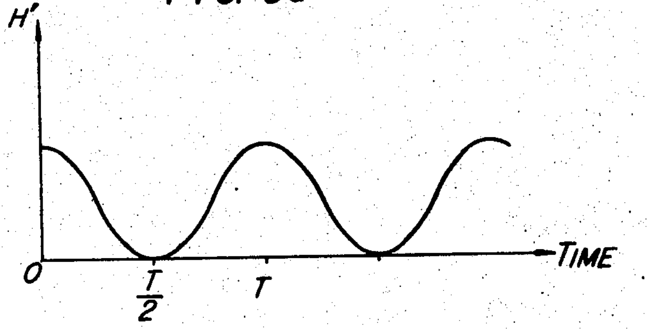
Figure 3B:
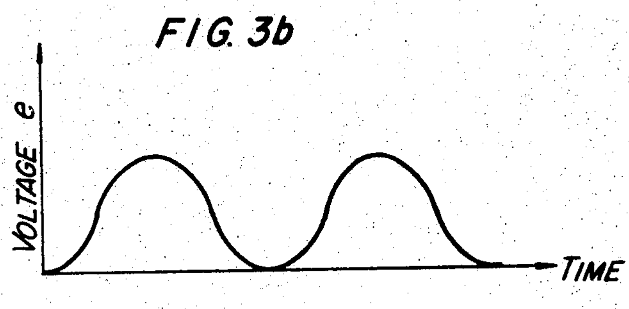
Figure 4A:
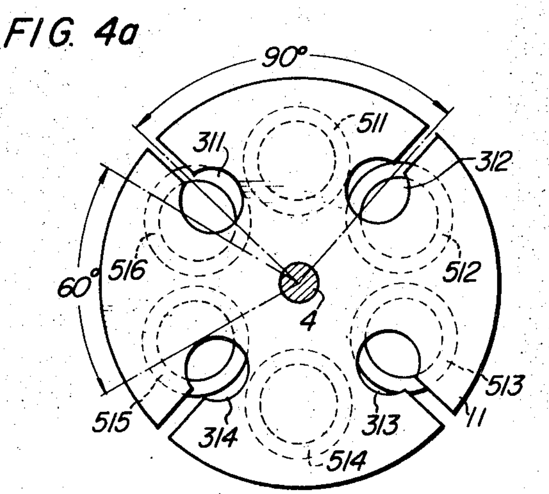
Figure 4B:
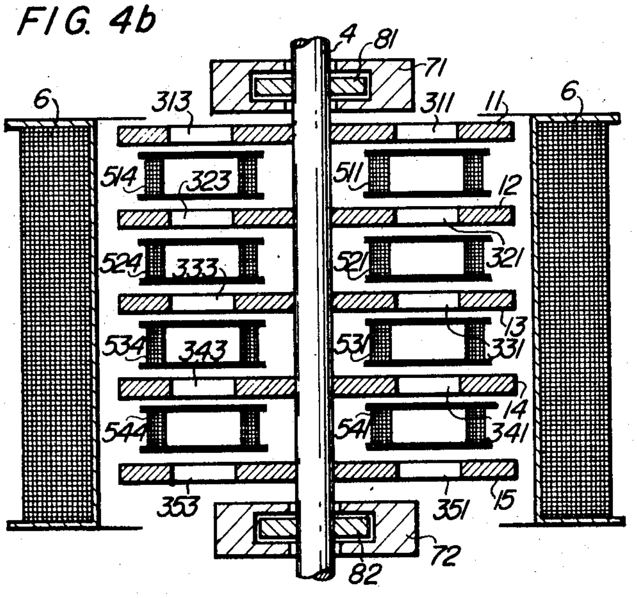
Figure 5:
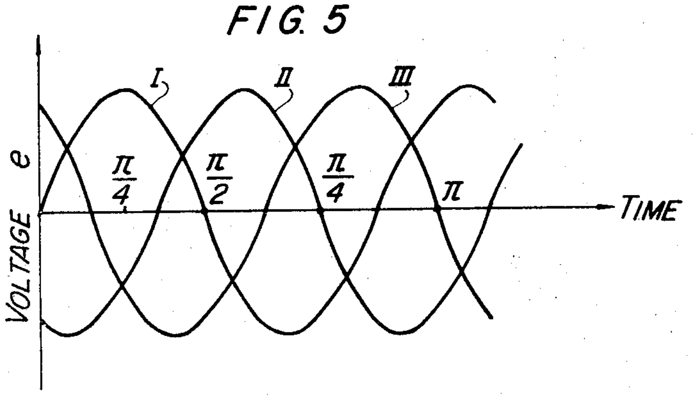
Figure 6A:
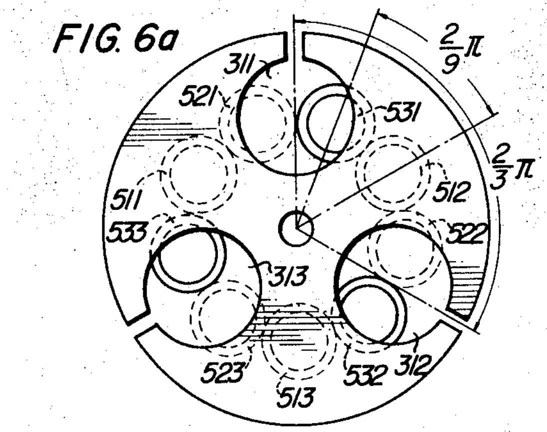
Figure 6B:
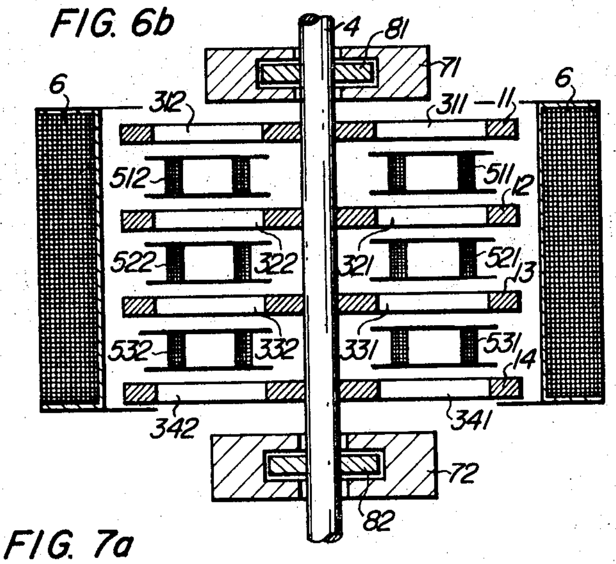
Figure 7A:
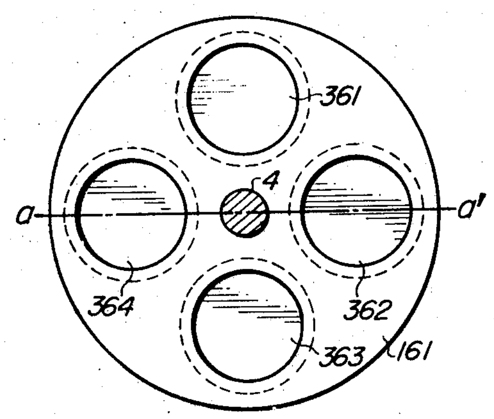
Figure 7B:
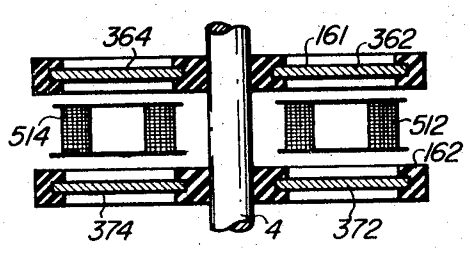
Figure 8A:
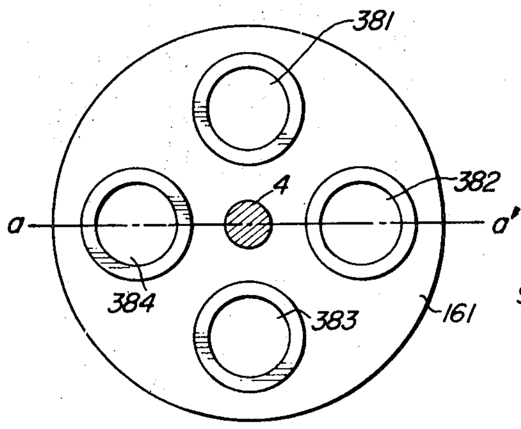
Figure 9A:
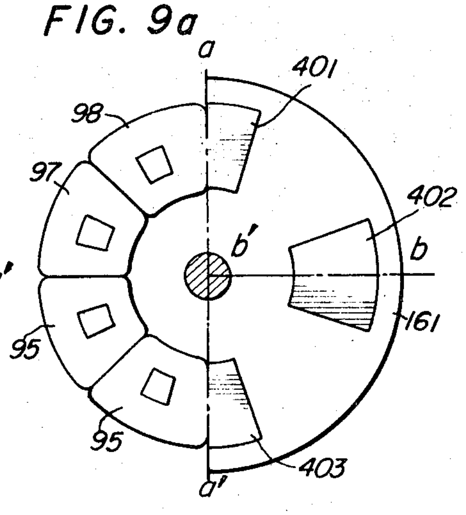
Figure 8B:
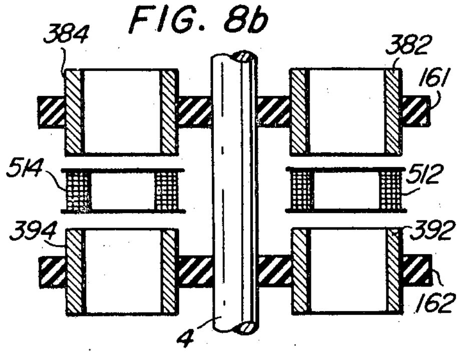
Figure 9B:
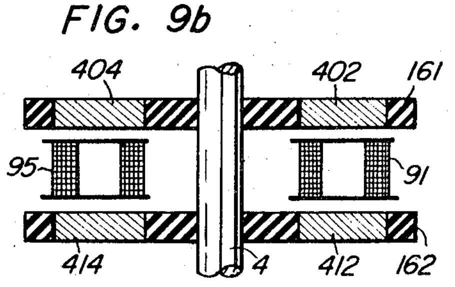
Figure 10A:
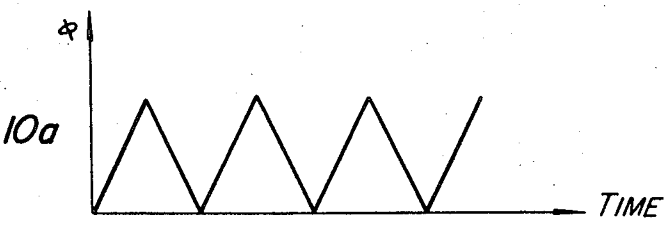
Figure 10B:
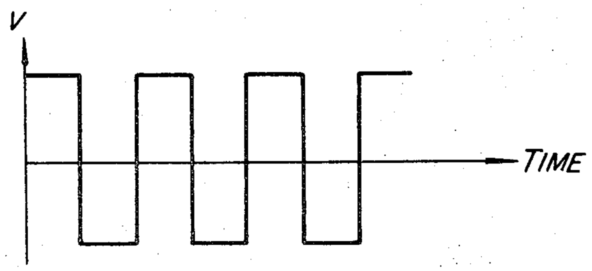

FIGS. 3*a* and 3*b* are graphic illustrations of the flux variation and the waveform of induced voltage in the apparatus shown in FIG. 1, respectively;

FIGS. 4*a* and 4*b* are a top plan view and an axial sectional view of an embodiment of the present invention, respectively;

FIG. 5 is a graphic illustration of the waveform of the output from the apparatus shown in FIGS. 4*a* and 4*b*;

FIGS. 6*a* and 6*b* are a top plan view and an axial sectional view of another embodiment of the present invention, respectively;

FIGS. 7*a* and 7*b* show part of a further embodiment of the present invention, FIG. 7*a* being a top plan view and FIG. 7*b* being a sectional view taken on the line *a–a'* in FIG. 7*a*;

FIGS. 8*a* and 8*b* show part of a still further embodiment of the present invention, FIG. 8*a* being a top plan view and FIG. 8*b* being a sectional view taken on the line *a–a'* in FIG. 8*a*;

FIGS. 9*a* and 9*b* show part of a yet further embodiment of the present invention, the right-hand side of the line *a–a'* in FIG. 8*a*;

FIGS. 9*a* and 9*b* show part of a yet further embodiment of the present invention, the right-hand side of the line *a–a'* in FIG. 9*a* showing a top plan view of a disc while the left-hand side of the line *a–a'* showing a top plan view of coils, and FIG. 9*b* being a sectional view taken on the line *b–b'* in FIG. 9*a*; and FIGS. 10*a* and 10*b* are graphic illustrations of the waveform of the output from the apparatus shown in FIGS. 9*a* and 9*b*.

Referring to FIG. 1, a pair of parallelly spaced rotating discs 1 and 2 are composed of an inhomogeneous hard superconducting material such as, for example, Nb - Zr - Ti, Nb3Sn or V3Ga. It is known that, when an external magnetic field H is applied perpendicularly with respect to the disc face at a temperature lower than the transition temperature $T_c$ of the superconducting material, the relation between the external magnetic field H and a magnetic field H' established between the rotating discs is represented by a curve as shown in FIG. 2.

Figure 2:
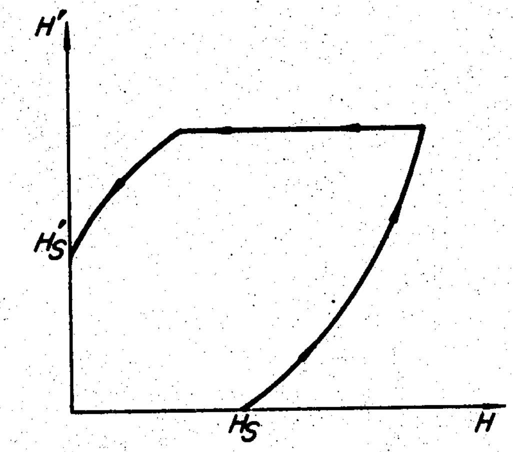
FIG. 2 is a graphic illustration of the characteristic of an inhomogeneous superconducting material.

As will be seen from FIG. 2, the magnetic field H' established between the discs is zero until the external magnetic field H is gradually increased from zero up to a value $H_S$. This is because the external magnetic field H is shielded by the discs in the above range.

On the other hand, when the external magnetic field H is increased to a value sufficiently larger than $H_S$ and then restored to zero again or when the external magnetic field H is increased to a value sufficiently larger than $H_S$ and the temperature of the discs is increased until the discs take their normal conducting state, a magnetic field $H_S'$ remains in the space between the discs even in a state in which the external magnetic field H does not exist any more. This means that the magnetic field is trapped between the discs. The values of $H_S$ and $H_S'$ and the shape of the curve H–H' are variable depending upon the kind of the superconducting material, microstructure of the superconducting material including defects such as dislocation and precipitation, geometry and dimensions of the parallel rotating discs, cooling condition and other factors.

The inventor made an ex periment as described below in order to realize a novel AC generator by utilizing the properties of a superconducting material as described above. An inhomogeneous hard superconducting material in the form of a ternary alloy of Nb - 40 Zr - 10 Ti was employed to form rotating discs 1 and 2 having an outside diameter of 4 cm., inside diameter of 0.5 cm. and thickness of 0.4 cm. Then as shown in FIG. 1, a suitable number of keyhole-shaped slots 3 were provided along the circumferentially predetermined spaced relation. The discs 1 and 2 were parallelly mounted on a rotor axis 4 in such a manner that the slots 3 of the discs 1 and 2 oppose to or are in registration with each other, and a Hall probe or armature coil 5 was disposed directly beneath one of the slots 3 of the disc 1 in the space defined between the discs 1 and 2. The assembly of the parallel discs was placed in liquid helium at 4.2° K. and was rotated at a fixed rotating speed while applying a fixed external magnetic field H ($<<H_{c2}$) perpendicular to the face of the disc. It was found that a magnetic field H' detected by the Hall probe varies in a manner as seen in FIG. 3*a*. When the armature coil was used in lieu of the Hall probe, an induced electromotive force *e* varying in a manner as seen in FIG. 3*b* could be derived. As a field means for producing the external magnetic field H, a superconducting solenoid 6 was placed in concentric relation with the rotating discs and a persistent current was supplied to the superconducting solenoid 6 for establishing the magnetic field.

While the experimental apparatus described above utilizes the magnetic shielding effect of an inhomogeneous superconducting material for producing an alternating magnetic field, such alternating magnetic field may similarly be produced by an arrangement in which rotating discs are composed of an electrical insulator, keyhole-shaped slots are bored along the circumference of the discs in circumferentially predetermined spaced relation, and pieces of an inhomogeneous hard superconducting material are embedded or fitted in the slot portions for entrapping the magnetic flux thereby. Further, the slots are not necessarily of keyhole shape but may be of other shape such as, for example, circular shape. In this latter case too, the effect similar to the above can be exhibited.

In the experiment described above, it was frequently observed that the alternating magnetic field detected by the Hall probe had a more or less distorted waveform. It was found that such waveform distortion results from the fact that a flux jump is locally developed due to an AC loss occurring at the surface of the discs as the discs of an inhomogeneous hard superconducting material rotate in the uniform magnetic field, and the flux jump acts to break the magnetic shielding effect temporarily. Such flux jump could be avoided and a fairly stable waveform could be obtained by covering the surface of the rotating discs with a metal such as, for example, silver or copper, or alternately stacking thin sheets of an inhomogeneous hard superconducting material and copper to form rotating discs of laminated structure, or by employing a sintered body of a porous inhomogeneous hard superconducting material to form the rotating discs.

The present invention is based on the test results given hereinbefore and will now be described in detail.

Referring to FIGS. 4*a* and 4*b*, the AC generator comprises a plurality of discs 11, 12, 13, 14 and 15 of an inhomogeneous hard superconducting material which are each provided with four equally spaced keyhole-shaped slots along the circumference thereof. For example, the disc 11 is provided with four slots 311, 312, 313 and 314 as seen in FIG. 4*a*. These discs 11, 12, 13, 14 and 15 are mounted on a rotor axis 4 in such a manner that they are parallelly spaced a predetermined distance from each other and their slot portions register with or are opposed to one another in the axial direction of the apparatus. Six coils 511 to 516 are disposed in the space between the discs 11 and 12 at positions at which they are interlinked by magnetic flux passing through the slots. Similarly, coils 521 to 526, coils 531 to 536 and coils 541 to 546 are disposed between the discs 12 and 13, between the discs 13 and 14, and between the discs 14 and 15, respectively. Although not shown in the drawing, these coils are suitably supported by suitable supporting means in the space between the discs. A superconducting field coil means 6 surrounds the discs 11 to 15 in coaxial relation with the rotor axis 4 for establishing a magnetic field which is vertical with respect to the disc face. The rotor axis 4 is journaled in bearing members 71 and 72 which are made from a material having a low coefficient of cubical expansion at low temperatures and retain therein bearings 81 and 82 which are made from a material having a high coefficient of cubical expansion and a low coefficient of friction at low temperatures. By this arrangement, vibration of the rotor can be reduced.

In the apparatus so constructed, the coils 511, 521, 531, 541 and the coils 514, 524, 534, 544 are connected in series with each other to constitute phase I, and the coils 512, 522, 532, 542 and the coils 515, 525, 535, 545 are connected in series with each other to constitute phase II, while the coils 513, 523, 533, 543 and the coils 516, 526, 536 546 are connected in series with each other to constitute phase III.

Suppose now that such apparatus is placed in liquid helium at a very low temperature and the disc 11 rotates clockwise from the position shown in FIG. 4*a*. In the position shown in FIG. 4*a*, the magnetic flux interlinking the coils 511 and 514 is zero. The interlinking magnetic flux increases gradually and becomes maximum when the disc 11 rotates by $\pi/4$ radians. The interlinking magnetic flux becomes zero again when the disc 11 rotates by $\pi/2$ radians. That is, voltage $v$ induced in the phase I varies in a manner as shown by I in FIG. 5 relative to the angular rotation of the discs. Similarly, voltages induced in the phase II and phase III vary with waveforms as shown by II and III in FIG. 5. Thus, a three-phase AC voltage as seen in FIG. 5 can be generated by the embodiment of the present invention shown in FIGS. 4*a* and 4*b*.

FIGS. 6*a* and 6*b* show another embodiment of the present invention. In the apparatus shown therein, series-connected coils 511, 512 and 513 which are spaced by $\frac{2}{3}\pi$ radians from each other are disposed in the space between discs 11 and 12 of an inhomogeneous hard superconducting material to constitute phase I. Similarly, series-connected coils 521, 522 and 523 which are spaced by $\frac{2}{3}\pi$ radians from each other are disposed in the space between discs 12 and 13 of an inhomogeneous hard superconducting material to constitute phase II, and series-connected coils 531, 532 and 533 which are spaced by $\frac{2}{3}\pi$ radians from each other are disposed in the space between discs 13 and 14 of an inhomogeneous hard superconducting material to constitute phase III. The coils of the phase I, phase II and phase III are secured at positions which are displaced by $2/9\pi$ radians from each other. A three-phase AC voltage as shown in FIG. 5 can be generated by the apparatus so constructed as in the case of the preceding embodiment.

While the two embodiments described above utilize the magnetic shielding property of a superconducting material, discs may have a structure as shown in FIGS. 7*a* and 7*b* in order to utilize the magnetic trapping property of such superconducting material.

Referring to FIG. 7*a*, parts of an electrically insulating member 161 of circular shape are bored and magnetic poles 361, 362, 363 and 364 of an inhomogeneous hard superconducting material such as, for example, an Nb - Zr - Ti alloy or sintered Nb3Sn are embedded or fitted in the bores to form a rotating disc.

A plurality of such discs 161 are used in lieu of the discs 11 to 15 shown in FIGS. 4 and 6, and the apparatus is subjected to a very low temperature. Then, current is supplied to the field coil means 6 to establish a magnetic field. When the field strength is restored to zero after increasing the field strength beyond $H_S$ in FIG. 2, a magnetic field having a strength $H_S'$ in FIG. 2 can be trapped by the magnetic poles 361 to 364. Therefore, rotation of the discs produces an alternating magnetic field as in the case of rotation of slotted discs as shown in FIGS. 4 and 6. Thus, with a disc structure in which magnetic poles are composed of a hard superconducting material and are electrically insulated from each other, a flux jump which may occur in one of the magnetic pole portions would not affect the remaining electrodes and any extreme distortion would not be brought about in the magnetic flux distribution.

FIGS. 8*a* and 8*b* show another form of the rotating disc preferably employed in the present invention. Parts of an electrically insulating member 161 of circular shape are bored to receive therein cylindrical magnetic poles 381 to 384 of an inhomogeneous hard superconducting material. This arrangement is effective to increase the magnetic trapping property.

FIGS. 9*a* and 9*b* show a further form of the rotating disc preferably employed in the present invention. A plurality of equally spaced sectoral slots are bored along the circumference of an electrically insulating member 161 of circular shape made from Bakelite, and a plurality of sectoral magnetic poles 401, 402, 403 and 404 of an inhomogeneous hard superconducting material such as, for example, sintered Nb3Sn are embedded or fitted in these slot portions. In this case, coils 91 to 98 disposed in the space between the discs have a sectoral shape as seen in FIG. 9*a*.

A plurality of such discs 161 and coils 91 to 98 are used in lieu of the discs 11 to 15 and the coils 511 to 546 shown in FIGS. 4 and 6, and the discs 161 are rotated in a fixed direction at a fixed speed. The magnetic flux interlinking the sectoral armature coils 91 to 98 starts to decrease at a fixed rate as the magnetic poles of hard superconducting material start to overlie the coils. The magnetic flux becomes zero when the magnetic poles completely register with or are opposed to the coils, and increases at a fixed rate as the magnetic poles move away from the coils. The magnetic flux reaches its maximum value when the magnetic poles have completely moved away from their overlying position on the coils. The relation therebetween is illustrated in FIG. 10*a* from which it will be seen that the number of magnetic flux $\Phi$ interlinking the armature coils 91 to 98 varies in the form of a triangular wave with respect to time. Therefore, voltage $$v\left(=\frac{d\phi}{dt}\right)$$

induced in the coils takes a rectangular waveform as seen in FIG. 10*b*.

It will thus be appreciated that a rectangular waveform voltage can easily be generated by the apparatus according to the present invention, and an AC voltage other than sine wave voltage can be generated by suitably selecting the shape of the slot portions of the rotating disc or of the superconducting material portions.

While various embodiments of the present invention have been described above, the present invention is in no way limited to such specific embodiments and many changes and modifications may be made therein without departing from the spirit of the present invention.

We claim:

1. A generator comprising at least one pair of rotating discs composed of an inhomogeneous hard superconducting material and kept at a superconducting state, said discs being provided with a plurality of slots along the circumference thereof and mounted on a rotor axis in parallel with each other in such a manner that the slots of one of said discs are opposed by the slots of the other, said discs having such a magnetic shielding property that they do not allow passage of magnetic flux at portions other than the slot portions, an armature coil disposed in the space between said parallel discs, said coil being disposed at a position at which it is interlinked by magnetic flux passing through the slot portions so as to thereby generate a voltage corresponding to the interlinking magnetic flux, and field means for externally applying a magnetic field to said discs in the axial direction of said rotator axis.

2. A generator as claimed in claim 1, in which a plurality of said discs are parallelly disposed and are each provided with four keyhole-shaped slots which are spaced by $\pi/2$ radians from each other, and six said coils are disposed between the adjacent discs in equally spaced relation form each other, those coils spaced by $\frac{2}{3}\pi$ radians being connected in series with each other to constitute phase I, phase II and phase III windings, respectively.

3. A generator as claimed in claim 1, in which four said discs are parallelly disposed and are each provided with three keyhole-shaped slots which are spaced $\frac{2}{3}\pi$ radians from each other, and three said coils forming a set are disposed between the adjacent discs and are spaced by $\frac{2}{3}\pi$ radians from each other, the respective sets of three coils constituting phase I, phase II and phase III windings, and any one coil in each phase being spaced by $2/9\pi$ radians from the corresponding coil in other phase.

4. A generator comprising at least one pair of rotating discs composed of an electrical insulator, a plurality of magnetic poles provided along the circumference of said insulator discs, said magnetic poles being formed by boring portions of said discs and embedding pieces of an inhomogeneous hard superconducting material in the bored portions, said discs being mounted on a rotor axis in parallel with each other in such a manner that the magnetic poles of one of said discs are opposed by the magnetic poles of the other, said discs being kept at a superconducting state so as to entrap a magnetic field between the opposite magnetic poles, and an armature coil disposed in the space between said discs, said coil being disposed at a position at which it is interlinked by the magnetic field between said electrodes so as to thereby generate a voltage corresponding to the interlinking magnetic flux.

5. A generator as claimed in claim 4, in which said magnetic poles of an inhomogeneous hard superconducting material are cylindrical in shape.

6. A generator comprising at least one pair of rotating discs composed of an electrical insulator, a plurality of magnetic poles provided along the circumference of said insulator discs, said magnetic poles being formed by boring portions of said discs and embedding pieces of an inhomogeneous hard superconducting material in the bored portions, said discs being mounted on a rotor axis in parallel with each other in such a manner that the magnetic poles of one of said discs are opposed by the magnetic poles of the other, said discs being kept at a superconducting state so as to shield a magnetic field, and an armature coil disposed in the space between said discs, said coil being disposed at a position at which it is interlinked by magnetic flux passing through the portions of said discs other than the magnetic poles portions so as to thereby generate a voltage corresponding to the interlinking magnetic flux.

7. A generator as claimed in claim 6, in which said magnetic poles and armature coil have a sectoral shape so that a rectangular wave voltage can be obtained from said armature coil.

UNITED STATES PATENT OFFICE
CERTIFICATE OF CORRECTION

Patent No. 3,564,307 Dated February 16, 1971

Inventor(s) Kawabe, et al

It is certified that error appears in the above-identified patent and that said Letters Patent are hereby corrected as shown below:

Third inventor's name should read:

--Mitsuhiro Kudo--

Priority data ([31]) should read:

--43/51850, 43/79967 and 44/47595--

Signed and sealed this 22nd day of May 1973.

(SEAL)
Attest:

EDWARD M.FLETCHER,JR.
Attesting Officer

ROBERT GOTTSCHALK
Commissioner of Pat